(12) United States Patent
Li et al.

(10) Patent No.: US 10,064,185 B2
(45) Date of Patent: Aug. 28, 2018

(54) FREQUENCY SPECTRUM ALLOCATION METHOD, DEVICE AND SYSTEM

(71) Applicant: CHINA ACADEMY OF TELECOMMUNICATIONS TECHNOLOGY, Beijing (CN)

(72) Inventors: Yuanyuan Li, Beijing (CN); Yu Yang, Beijing (CN); Guangyuan Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/322,445

(22) PCT Filed: Jun. 23, 2015

(86) PCT No.: PCT/CN2015/082120
§ 371 (c)(1),
(2) Date: Dec. 27, 2016

(87) PCT Pub. No.: WO2015/196980
PCT Pub. Date: Dec. 30, 2015

(65) Prior Publication Data
US 2017/0135106 A1     May 11, 2017

(30) Foreign Application Priority Data
Jun. 27, 2014   (CN) .......................... 2014 1 0302922

(51) Int. Cl.
*H04L 1/00*       (2006.01)
*H04W 72/04*   (2009.01)
(Continued)

(52) U.S. Cl.
CPC .......... *H04W 72/0453* (2013.01); *H04L 5/005* (2013.01); *H04W 24/06* (2013.01); *H04W 72/1231* (2013.01)

(58) Field of Classification Search
CPC .. H04B 7/2121; H04B 7/2123; H04B 7/2615; H04B 7/02; H04J 2203/0069; H04J 4/00;
(Continued)

(56) References Cited

U.S. PATENT DOCUMENTS

2011/0039554 A1    2/2011  Bims
2014/0073335 A1*  3/2014  Panchal ................. H04W 4/00
                                                                                455/450

FOREIGN PATENT DOCUMENTS

CN       1984430 A       6/2007
CN     101132255 A       2/2008
(Continued)

OTHER PUBLICATIONS

Chinese IP Office, Office Action dated Jan. 18, 2017 in corresponding Chinese Application No. 201410302922.8 (filed Jun. 27, 2014), 10 pages.
(Continued)

Primary Examiner — Dady Chery
(74) Attorney, Agent, or Firm — Womble Bond Dickinson (US) LLP

(57) ABSTRACT

Disclosed are a frequency spectrum allocation method, device and system, so that a specific frequency spectrum allocation solution is provided for an application scenario of a multi-operator/perception system sharing a frequency spectrum. The method comprises: receiving first system throughputs which are reported by servers belonging to different operators and are determined by the servers on each frequency spectrum reference unit, wherein an available frequency spectrum is divided into a plurality of frequency
(Continued)

spectrum reference units; and for each frequency spectrum reference unit, according to the first system throughput which is reported by the server of each operator on the frequency spectrum reference unit, allocating the frequency spectrum reference unit to the operator of which the value of the first system throughput is the maximum, thereby improving the usage efficiency of the available frequency spectrum.

12 Claims, 7 Drawing Sheets

(51) Int. Cl.
*H04L 5/00* (2006.01)
*H04W 24/06* (2009.01)
*H04W 72/12* (2009.01)

(58) Field of Classification Search
CPC ...... H04J 2011/0006; H04J 2203/0092; H04Q 2213/394; H04Q 5/12; H04Q 9/12; H04W 72/04; H04W 72/12; H04W 76/00; H04L 5/26; H03H 7/46
USPC .............. 370/329, 330, 341–348; 455/452.1, 455/550.1, 56
See application file for complete search history.

(56) References Cited

FOREIGN PATENT DOCUMENTS

| | | |
|---|---|---|
| CN | 101436891 A | 5/2009 |
| CN | 101626618 A | 1/2010 |
| CN | 201947445 U | 8/2011 |
| CN | 103718487 A | 4/2014 |
| CN | 104066092 A | 9/2014 |

OTHER PUBLICATIONS

European Patent Office, Extended European Search Report dated Jun. 7, 2017 in corresponding European Patent Application No. 15810932.2 (filed Jun. 23, 2015), 7 pages.

PCT International Search Report for PCT Counterpart Application No. PCT/CN2015/082120, 5 pp. (including English translation), (dated Sep. 25, 2015).

PCT Written Opinion of the International Searching Authority for PCT Counterpart Application No. PCT/CN2015/082120, 8 pp. (including English translation), (dated Sep. 25, 2015).

Second Office Action for counterpart Chinese Patent Appiication No. 201410302922.8 with English translation, 10 pgs., (dated Jul. 17, 2017).

* cited by examiner

FREQUENCY SPECTRUM ALLOCATION METHOD, DEVICE AND SYSTEM

CROSS-REFERENCE TO RELATED APPLICATIONS

This patent application is a U.S. National Phase Application under 35 U.S.C. § 371 of International Application No. PCT/CN2015/082120, filed on Jun. 23, 2015, entitled FREQUENCY SPECTRUM ALLOCATION METHOD, DEVICE AND SYSTEM, which claims the benefit of Chinese Patent Application No. 201410302922.8, filed with the Chinese Patent Office on Jun. 27, 2014, and entitled "Frequency spectrum allocation method, apparatus and system", which was incorporated by reference in its entirety.

FIELD

The present invention relates to the field of communications, and particularly to a frequency spectrum allocation method, apparatus and system.

BACKGROUND

The radio communication frequency spectrums are valuable natural resources. The frequency spectrum resources become increasingly scarce along with the rapid development of radio communications. At present, a fixed frequency spectrum allocation is applied to a radio communication network, and the related departments and organizations have identified from their monitoring and studies on the radio communication frequency spectrums that some frequency bands (e.g., a TV frequency band) are idle in the majority of periods of time or in the majority of regions, whereas some frequency bands are competed for by multiple systems and multiple users at the same time, that is, there are no sufficient frequency spectrum resources for some system carrying a large amount of traffic, whereas too many frequency spectrum resources are occupied by some system carrying a small amount of traffic.

In order to improve the utilization ratio of the frequency spectrum resources, the technology of Cognitive Radio (CR) has emerged in response to this. A general idea thereof lies in that a change to the current radio communication environment is detected, and an white space frequency band of an incumbent system is selected dynamically for communication, without any interference with the incumbent system, to avoid the frequency spectrum resources from being accessed unreasonably at present as a result of fixed allocation of the frequency spectrum, where the white space frequency band refers to a frequency band allocated to the incumbent system and being in an idle state. Based on the technology of cognitive radio, an access system which can access the idle-state frequency spectrum allocated to the incumbent system for communication will be referred to as a cognitive system.

There are generally two categories of application scenarios of cognitive radio, where the first category relates to an opportunistic access to the frequency spectrum of the incumbent system, for example, an International Mobile Telecommunication (IMT) system accesses an white space frequency band of a radio and TV system; and the second category relates to an opportunistic access of multiple cognitive systems to some frequency band which is not authorized individually to any system, but accessed fairly by the multiple systems.

In the first category of scenarios, the service performance of the incumbent system, or a system at a high priority is required to be guaranteed, and particularly the cognitive system determines accurately which frequency bands are available white space frequency bands (some cognitive system can be introduced to these frequency bands without any influence upon normal operation of the incumbent system, or the system at a high priority); and if the occupied frequency bands become not available any longer, that is, the incumbent system, or the system at a high priority becomes operative, then the cognitive system will give up these frequency bands to the incumbent system, or the system at a high priority.

In the second category of scenarios, there is such a more typical application scenario that multiple operators share some frequency bands under the management by a centralized frequency spectrum manager, that is, dynamic frequency spectrum allocation or sharing problem is involved. Dynamic frequency spectrum allocation or sharing is essentially a multi-objective optimization problem, and since respective participants (including a frequency spectrum administrative department, an authorized user, an operator, and a cognitive user) belong to different organizations, and have different objectives and benefits, their decisive behaviors may affect each other, and have a competitive and cooperative relationship with each other. In this case, it may be crucial to design an access or allocation rule of the frequency spectrum, to coordinate the behaviors of the respective participants, to enable the frequency spectrum to be shared efficiently, to satisfy their different benefit demands, and to optimize the access efficiency of the frequency spectrum.

In summary, there has been absent so far a particular solution of frequency spectrum allocation in an application scenario where a frequency spectrum is shared by multiple operators or cognitive systems.

SUMMARY

Embodiments of the invention provide a frequency spectrum allocation method, apparatus, and system so as to provide a particular solution of frequency spectrum allocation in an application scenario where a frequency spectrum is shared by multiple operators or cognitive systems.

An embodiment of the invention provides a frequency spectrum allocation method including:

receiving first system throughputs, reported by servers of different operators, determined by the servers on each frequency spectrum reference unit, where an available frequency spectrum is divided into a number of frequency spectrum reference units; and for each frequency spectrum reference unit, allocating the frequency spectrum reference unit to an operator with a largest value of the first system throughput according to the first system throughputs reported by the servers of the respective operators on the frequency spectrum reference unit.

In the embodiment of the invention, the first system throughputs, reported by the servers of the different operators and determined by the servers on each frequency spectrum reference unit are compared, and the different frequency spectrum reference units are allocated to the different operators, to thereby improve the access efficiency of the available frequency spectrum.

Preferably the method further includes:

re-dividing the frequency spectrum reference units, and notifying the updated frequency spectrum reference units to the servers of the different operators, so that the servers report first system throughputs determined on each updated frequency spectrum reference unit.

Preferably the re-dividing the frequency spectrum reference units includes:

if the available frequency spectrum is changed, then re-dividing the available frequency spectrum into frequency spectrum reference units at an original granularity for dividing an available frequency spectrum into frequency spectrum reference units; or if the granularity for dividing an available frequency spectrum into frequency spectrum reference units is changed, then re-dividing the available frequency spectrum into frequency spectrum reference units at the updated granularity; or if both the available frequency spectrum and the granularity for dividing an available frequency spectrum into frequency spectrum reference units are changed, then re-dividing the available frequency spectrum into frequency spectrum reference units at the updated granularity.

An embodiment of the invention provides another frequency spectrum allocation method including:

receiving second system throughputs, reported by respective served base stations, determined by the base stations on each frequency spectrum reference unit, where an available frequency spectrum is divided into a number of frequency spectrum reference units;

for each frequency spectrum reference unit, integrating the second system throughputs, reported by the respective base stations, determined on the frequency spectrum reference unit, and determining a result of integration as a first system throughput corresponding to the frequency spectrum reference unit; and reporting the determined first system throughput corresponding to each frequency spectrum reference unit to a frequency spectrum allocation apparatus.

In the embodiment of the invention, the determined first system throughputs corresponding to each frequency spectrum reference unit are reported to the frequency spectrum allocation apparatus, so that the frequency spectrum allocation apparatus can compare the first system throughputs, reported by the servers of the different operators and determined by the servers on each frequency spectrum reference unit, and allocate the different frequency spectrum reference units to the different operators, to thereby improve the access efficiency of the available frequency spectrum.

Preferably the determining, by each of the base stations, the second system throughput on each frequency spectrum reference unit includes:

receiving, by the base station, channel qualities measured by respective terminals on each Physical Resource Block (PRB) of each frequency spectrum reference unit, where the base station configures a common pilot signal on each PRB of each frequency spectrum reference unit, and the channel quality measured on each PRB of each frequency spectrum reference unit is a channel quality measured by each terminal using the common pilot signal on the PRB;

performing, by the base station, simulated resource scheduling on each terminal, and determining a corresponding channel quality on a PRB allocated simulatively to each terminal from the received channel qualities according to a resource allocation result of simulated resource scheduling; and determining, by the base station, a corresponding system throughput on the PRB allocated simulatively to each terminal according to a corresponding relationship between a channel quality and a system throughput, and determining the determined system throughputs corresponding to the PRBs belonging to the respective frequency spectrum reference units as the second system throughputs of the respective frequency spectrum reference units.

Preferably the method further includes:

after updated frequency spectrum reference units notified by the frequency spectrum allocation apparatus are received, notifying the updated frequency spectrum reference units to the respective served base stations, so that the base stations report second system throughputs determined on each updated frequency spectrum reference unit.

An embodiment of the invention provides a frequency spectrum allocation apparatus including:

a receiving module configured to receive first system throughputs, reported by servers of different operators, determined by the servers on each frequency spectrum reference unit, where an available frequency spectrum is divided into a number of frequency spectrum reference units; and a processing module configured, for each frequency spectrum reference unit, to allocate the frequency spectrum reference unit to an operator with a largest value of the first system throughput according to the first system throughputs reported by the servers of the respective operators on the frequency spectrum reference unit.

Preferably the apparatus further includes:

a frequency spectrum dividing module configured to re-divide the frequency spectrum reference units, and to notify the updated frequency spectrum reference units to the servers of the different operators, so that the servers report first system throughputs determined on each updated frequency spectrum reference unit.

Preferably the frequency spectrum dividing module is particularly configured:

if the available frequency spectrum is changed, to re-divide the available frequency spectrum into frequency spectrum reference units at an original granularity for dividing an available frequency spectrum into frequency spectrum reference units; or if the granularity for dividing an available frequency spectrum into frequency spectrum reference units is changed, to re-divide the available frequency spectrum into frequency spectrum reference units at the updated granularity; or if both the available frequency spectrum and the granularity for dividing an available frequency spectrum into frequency spectrum reference units are changed, to re-divide the available frequency spectrum into frequency spectrum reference units at the updated granularity.

An embodiment of the invention provides a server of an operator, the server including:

a receiving module configured to receive second system throughputs, reported by respective base stations served by the server, determined by the base stations on each frequency spectrum reference unit, where an available frequency spectrum is divided into a number of frequency spectrum reference units;

a processing module configured, for each frequency spectrum reference unit, to integrate the second system throughputs, reported by the respective base stations, determined on the frequency spectrum reference unit, and to determine a result of integration as a first system throughput corresponding to the frequency spectrum reference unit; and a sending module configured to report the determined first system throughput corresponding to each frequency spectrum reference unit to a frequency spectrum allocation apparatus.

Preferably the receiving module is further configured to receive updated frequency spectrum reference units notified by the frequency spectrum allocation apparatus; and the sending module is further configured to notify the updated frequency spectrum reference units to the respective base stations served by the server, so that the base stations report second system throughputs determined on each updated frequency spectrum reference unit.

An embodiment of the invention provides a base station including:

a receiving module configured to receive channel qualities measured by respective terminals on each Physical Resource Block (PRB) of each frequency spectrum reference unit, where the base station configures a common pilot signal on each PRB of each frequency spectrum reference unit, and the channel quality measured on each PRB of each frequency spectrum reference unit is a channel quality measured by each terminal using the common pilot signal on the PRB;

a simulated scheduling module configured to perform simulated resource scheduling on each terminal, and to determine a corresponding channel quality on a PRB allocated simulatively to each terminal from the received channel qualities according to a resource allocation result of simulated resource scheduling; and a processing module configured to determine a corresponding system throughput on the PRB allocated simulatively to each terminal according to a corresponding relationship between a channel quality and a system throughput, to determine the determined system throughputs corresponding to the PRBs belonging to the respective frequency spectrum reference units as the second system throughputs of the respective frequency spectrum reference units, and to report the determined second system throughputs of respective frequency spectrum reference units to a server of an operator.

An embodiment of the invention provides another frequency spectrum allocation apparatus including a transceiver, and at least one processor connected with the transceiver, where:

the transceiver is configured to receive first system throughputs, reported by servers of different operators, determined by the servers on each frequency spectrum reference unit, where an available frequency spectrum is divided into a number of frequency spectrum reference units; and the processor is configured, for each frequency spectrum reference unit, to allocate the frequency spectrum reference unit to an operator with a largest value of the first system throughput according to the first system throughputs reported by the servers of the respective operators on the frequency spectrum reference unit.

Where the transceiver and the processor can be connected via a bus.

Preferably the processor is further configured:

to re-divide the frequency spectrum reference units, and to notify the updated frequency spectrum reference units to the servers of the different operators, so that the servers of the respective operators report first system throughputs determined on each updated frequency spectrum reference unit.

Preferably the processor is particularly configured:

if the available frequency spectrum is changed, to re-divide the available frequency spectrum into frequency spectrum reference units at an original granularity for dividing an available frequency spectrum into frequency spectrum reference units; or if the granularity for dividing an available frequency spectrum into frequency spectrum reference units is changed, to re-divide the available frequency spectrum into frequency spectrum reference units at the updated granularity; or if both the available frequency spectrum and the granularity for dividing an available frequency spectrum into frequency spectrum reference units are changed, to re-divide the available frequency spectrum into frequency spectrum reference units at the updated granularity.

An embodiment of the invention provides another server of an operator, the server including a transceiver, and at least one processor connected with the transceiver, where:

the transceiver is configured to receive second system throughputs, reported by respective base stations served by the server, determined by the base stations on each frequency spectrum reference unit, where an available frequency spectrum is divided into a number of frequency spectrum reference units;

the processor is configured, for each frequency spectrum reference unit, to integrate the second system throughputs, reported by the respective base stations, determined on the frequency spectrum reference unit, and to determine a result of integration as a first system throughput corresponding to the frequency spectrum reference unit; and the transceiver is configured to report the determined first system throughput corresponding to each frequency spectrum reference unit to a frequency spectrum allocation apparatus.

Where the transceiver and the processor can be connected via a bus.

Preferably the transceiver is further configured to receive updated frequency spectrum reference units notified by the frequency spectrum allocation apparatus; and to notify the updated frequency spectrum reference units to the respective base stations served by the server, so that the base stations report second system throughputs determined on each updated frequency spectrum reference unit.

An embodiment of the invention provides another base station including a transceiver, and at least one processor connected with the transceiver, where:

the transceiver is configured to receive channel qualities measured by respective terminals on each Physical Resource Block (PRB) of each frequency spectrum reference unit, where the base station configures a common pilot signal on each PRB of each frequency spectrum reference unit, and the channel quality measured on each PRB of each frequency spectrum reference unit is a channel quality measured by each terminal using the common pilot signal on the PRB;

the processor is configured to perform simulated resource scheduling on each terminal, and to determine a corresponding channel quality on a PRB allocated simulatively to each terminal from the received channel qualities according to a resource allocation result of simulated resource scheduling; to determine a corresponding system throughput on the PRB allocated simulatively to each terminal according to a corresponding relationship between a channel quality and a system throughput, to determine the determined system throughputs corresponding to the PRBs belonging to the respective frequency spectrum reference units as the second system throughputs of the respective frequency spectrum reference units; and the transceiver is configured to report the determined second system throughputs of the respective frequency spectrum reference units to a server.

Where the transceiver and the processor can be connected via a bus.

An embodiment of the invention provides a communication system including:

servers of operators, configured to receive second system throughputs, reported by respective base stations served by the servers, determined by the base stations on each frequency spectrum reference unit; for each frequency spectrum reference unit, to integrate the second system throughputs, reported by the respective base stations, determined on the frequency spectrum reference unit, and to determine results of integration as first system throughputs corresponding to the frequency spectrum reference unit; and to report the determined first system throughputs corresponding to each frequency spectrum reference unit to a frequency spectrum allocation apparatus; and the frequency spectrum allocation apparatus configured to receive the first system throughputs, reported by the servers of the different operators, determined by the servers on each frequency spectrum reference unit, where an available frequency spectrum is divided into a number of frequency spectrum reference units; and for each frequency spectrum reference unit, to allocate the frequency spectrum reference unit to an operator with a largest value of the first system throughput according to the first system throughputs reported by the servers of the respective operators on the frequency spectrum reference unit.

Preferably each of the base stations is configured:

to receive channel qualities measured by respective terminals on each Physical Resource Block (PRB) of each frequency spectrum reference unit, where the base station configures a common pilot signal on each PRB of each frequency spectrum reference unit, and the channel quality measured on each PRB of each frequency spectrum reference unit is a channel quality measured by each terminal using the common pilot signal on the PRB;

to perform simulated resource scheduling on each terminal, and to determine a corresponding channel quality on a PRB allocated simulatively to each terminal from the received channel qualities according to a resource allocation result of simulated resource scheduling; and to determine a corresponding system throughput on the PRB allocated simulatively to each terminal according to a corresponding relationship between a channel quality and a system throughput, and to determine the determined system throughputs corresponding to the PRBs belonging to the respective frequency spectrum reference units as the second system throughputs of the respective frequency spectrum reference units.

In the methods, apparatuses, and system according to the embodiments of the invention, the servers of the different operators report the determined first system throughputs corresponding to each frequency spectrum reference unit to the frequency spectrum allocation apparatus, so that the spectrum allocation apparatus can compare the first system throughputs, reported by the servers of the different operators and determined by the servers on each frequency spectrum reference unit, and allocate the different frequency spectrum reference units to the different operators, to thereby improve the access efficiency of the available frequency spectrum.

DETAILED DESCRIPTION OF THE EMBODIMENTS

In the embodiments of the invention, first system throughputs, reported by servers of different operators and determined by the servers on each frequency spectrum reference unit are compared, and the different frequency spectrum reference units are allocated to the different operators, to thereby improve the access efficiency of the available frequency spectrum.

When frequency spectrum allocation is performed, a centralized system architecture can be applied, where there is a central control node (i.e., a frequency spectrum allocation apparatus as referred to in the embodiments of the invention), and the servers of the different operators report frequency spectrum demands of the operators, so that the central control node allocates the frequency spectrum to the respective operators under some frequency spectrum allocation criterion.

The embodiments of the invention will be described below in further details with reference to the drawings. It shall be appreciated that the embodiments described here are merely intended to illustrate and explain the invention, but not to limit the invention.

Figure 1:
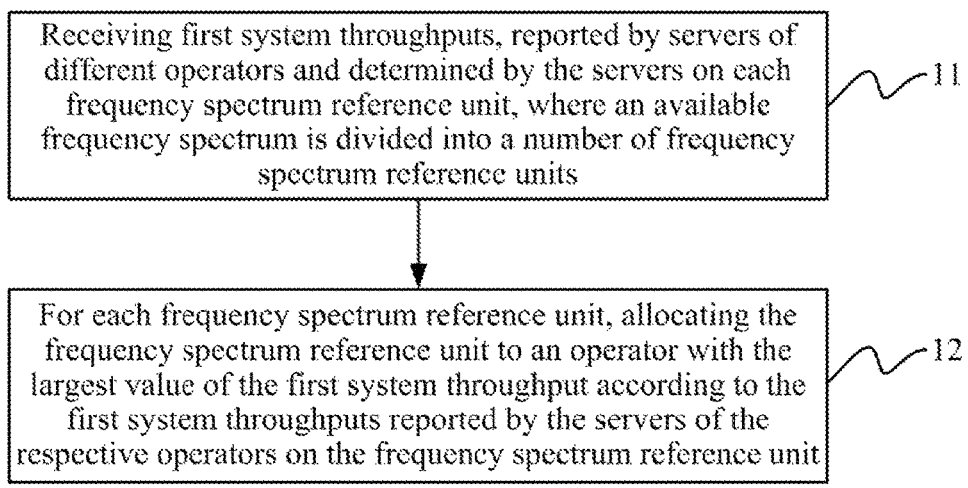
FIG. 1 is a schematic flow chart of a frequency spectrum allocation method according to an embodiment of the invention.

As illustrated in FIG. 1, a frequency spectrum allocation method according to an embodiment of the invention includes:

Operation 11, receiving first system throughputs, reported by servers of different operators and determined by the servers on each frequency spectrum reference unit, where an available frequency spectrum is divided into a number of frequency spectrum reference units.

In an embodiment of the invention, each operator can be provided with an access to the entire available frequency spectrum, for example.

Operation 12, for each frequency spectrum reference unit, allocating the frequency spectrum reference unit to an operator with the largest value of the first system throughput according to the first system throughputs reported by the servers of the respective operators on the frequency spectrum reference unit.

In the embodiments of the invention, the first system throughputs, reported by the servers of the different operators and determined by the servers on each frequency spectrum reference unit are received, where the available frequency spectrum is divided into a number of frequency spectrum reference units; and for each frequency spectrum reference unit, the frequency spectrum reference unit is allocated to the operator with the largest value of the first system throughput according to the first system throughputs reported by the servers of the respective operators on the frequency spectrum reference unit, to thereby improve the access efficiency of the available frequency spectrum.

Figure 2:
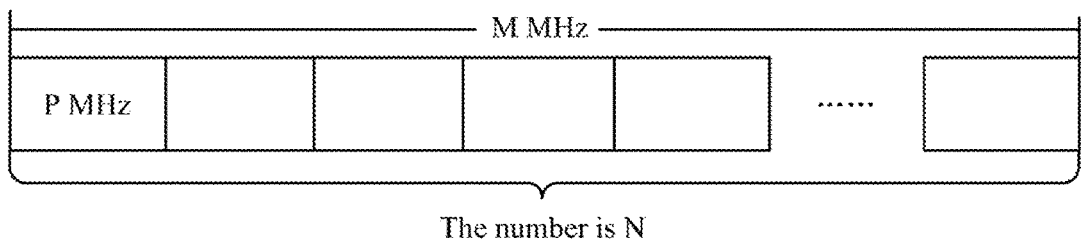
FIG. 2 is a schematic diagram of division into spectrum reference units according to an embodiment of the invention.

In an implementation, the available frequency spectrum is initially divided into frequency spectrum reference units at a set granularity for dividing an available frequency spectrum into frequency spectrum reference units. By way of an example, as illustrated in FIG. 2, if the available frequency spectrum is M MHz, and the set granularity for dividing an available frequency spectrum into frequency spectrum reference units is P MHz, then the available frequency spectrum will be divided into N=M/P frequency spectrum reference units.

It shall be noted that the frequency spectrum reference units can be initially determined by a frequency spectrum allocation apparatus, and notified to the servers of the different operators, or can be predefined, although the invention will not be limited to any particular scheme in which the frequency spectrum reference units are initially configured, as long as both the frequency spectrum allocation apparatus, and the servers of the different operators can know the initial frequency spectrum reference units.

In an implementation, preferably the method further includes:

Re-dividing the available frequency spectrum into frequency spectrum reference units, and notifying the updated frequency spectrum reference units to the servers of the different operators, so that the servers report first system throughputs determined on each updated frequency spectrum reference unit.

Preferably the re-dividing the available frequency spectrum into frequency spectrum reference units could be applied in the following three scenarios:

If the available frequency spectrum is changed, then the available frequency spectrum will be re-divided into frequency spectrum reference units at the original granularity for dividing an available frequency spectrum into frequency spectrum reference units; or If the granularity for dividing an available frequency spectrum into frequency spectrum reference units is changed, then the available frequency spectrum will be re-divided into frequency spectrum reference units at the updated granularity; or If both the available frequency spectrum and the granularity for dividing an available frequency spectrum into frequency spectrum reference units are changed, then the available frequency spectrum will be re-divided into frequency spectrum reference units at the updated granularity.

Figure 3:
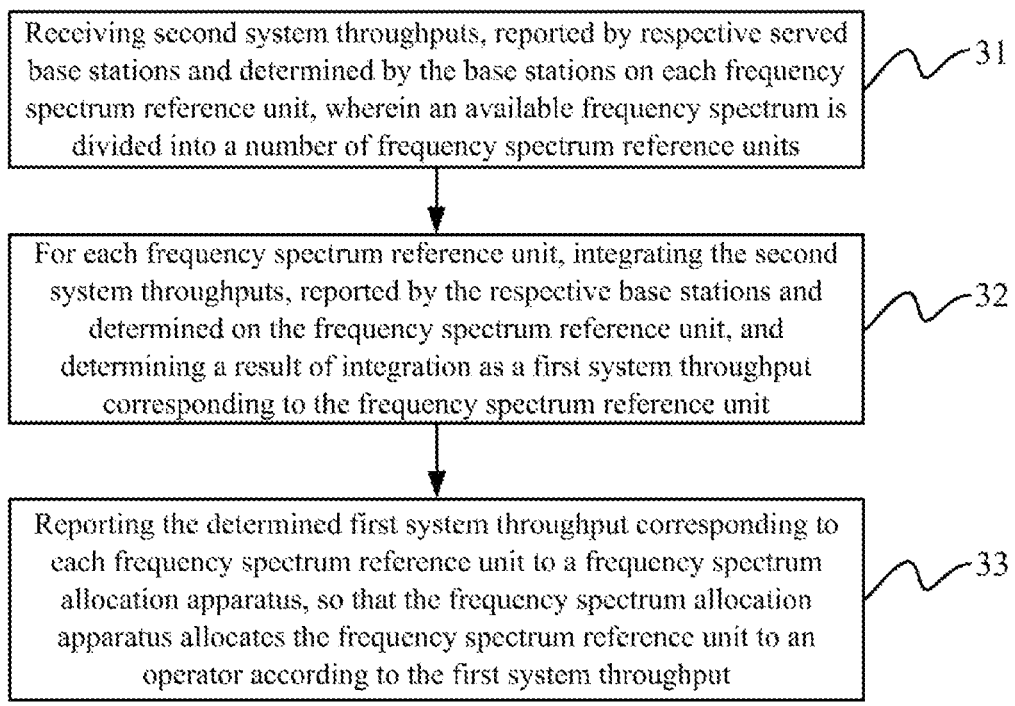
FIG. 3 is a schematic flow chart of another frequency spectrum allocation method according to an embodiment of the invention.

Based upon the same inventive idea, as illustrated in FIG. 3, another frequency spectrum allocation method according to an embodiment of the invention includes:

Operation 31, receiving second system throughputs, reported by respective served base stations, determined by the base stations on each frequency spectrum reference unit, where an available frequency spectrum is divided into a number of frequency spectrum reference units;

Operation 32, for each frequency spectrum reference unit, integrating the second system throughputs, reported by the respective base stations and determined on the frequency spectrum reference unit, and determining a result of integration as a first system throughput corresponding to the frequency spectrum reference unit; and Operation 33, reporting the determined first system throughput corresponding to each frequency spectrum reference unit to a frequency spectrum allocation apparatus, so that the frequency spectrum allocation apparatus allocates the frequency spectrum reference unit to an operator according to the first system throughput.

In the embodiments of the invention, the second system throughputs, reported by the respective served base stations and determined by the base stations on each frequency spectrum reference unit, are received; for each frequency spectrum reference unit, the second system throughputs, reported by the respective base stations and determined on the frequency spectrum reference unit are integrated, and the result of integration is determined as the first system throughput corresponding to the frequency spectrum reference unit; and the determined first system throughput corresponding to each frequency spectrum reference unit is reported to the frequency spectrum allocation apparatus, so that the frequency spectrum allocation apparatus allocates the frequency spectrum reference unit to the operator according to the first system throughput, to thereby improve the access efficiency of the available frequency spectrum.

In an implementation, each of the base stations determines the second system throughput on each frequency spectrum reference unit as follows:

The base station receives channel qualities measured by respective terminals on each Physical Resource Block (PRB) of each frequency spectrum reference unit, where the base station configures a common pilot signal on each PRB of each frequency spectrum reference unit, and the channel quality measured on each PRB of each frequency spectrum reference unit is a channel quality measured by each terminal using the common pilot signal on the PRB;

The base station performs simulated resource scheduling on each terminal, and determines a corresponding channel quality on a PRB allocated simulatively to each terminal from the received channel qualities according to a resource allocation result of simulated resource scheduling; and The base station determines a corresponding system throughput on the PRB allocated simulatively to each terminal according to a corresponding relationship between a channel quality and a system throughput, and determines the determined system throughputs corresponding to the PRBs belonging to the respective frequency spectrum reference units as the second system throughputs of the respective frequency spectrum reference units.

Preferably the base station determines the corresponding relationship between a channel quality and a system throughput in the following operations:

The base station selects an appropriate Modulation and Coding Scheme (MCS) level according to the channel quality;

The base station determines a corresponding Transport Block Size (TBS) according to the selected MCS level; and The base station determines the system throughput according to the determined TBS, and a received signal to noise ratio.

In an implementation, all the terminals in a cell served by each operator measure channel qualities on each of PRBs of each frequency spectrum reference unit configured for the cell, and report the measured channel qualities to the base station serving the terminals.

By way of an example, the base station determines the second system throughputs as depicted in Table 1 according to the resource allocation result of simulated resource scheduling.

TABLE 1

| Frequency spectrum reference unit number | Resource number | UE (terminal) number | Second system throughput |
|---|---|---|---|
| Frequency spectrum reference unit 1 | PRB_1 | UE_X | Throuthput$_{PRB1}$ |
| | PRB_2 | UE_X | Throuthput$_{PRB2}$ |
| | PRB_3 | UE_Y | Throuthput$_{PRB3}$ |
| | ... | ... | ... |
| | PRB_n | UE_W | Throuthput$_{PRBn}$ |
| Frequency spectrum reference unit 2 | PRB_1 | UE_X | Throuthput$_{PRB1}$ |
| | PRB_2 | UE_X | Throuthput$_{PRB2}$ |
| | PRB_3 | UE_Y | Throuthput$_{PRB3}$ |
| | ... | ... | ... |
| | PRB_n | UE_W | Throuthput$_{PRBn}$ |
| ... | ... | ... | ... |

According to Table 1, in the operation 32, for each frequency spectrum reference unit, the second system throughputs, reported by the respective base stations, determined on the frequency spectrum reference unit are integrated, and the result of integration is determined as the first system throughput corresponding to the frequency spectrum reference unit, as depicted in Table 2.

TABLE 2

| Operator number | Frequency spectrum reference unit 1 | Frequency spectrum reference unit 2 | ... | Frequency spectrum reference unit N |
|---|---|---|---|---|
| 1 | Throught_1 | Throught_2 | ... | Throught_N |

Where $$\text{Throughput\_1} = \sum_{i=PRB1}^{PRBn} Throuthput_i,$$

i.e., the sum of the first n throughputs in the fourth column in Table 1, and similarly Throught_2 is calculated, so a repeated description thereof will be omitted here.

It shall be noted that the base station performs simulated resource scheduling on the respective terminals by allocating a PRB to each terminal under some resource scheduling criterion, where the resource allocation result of simulated resource scheduling will not be notified to the terminal, and no service will be transmitted over the resource for performing simulated resource scheduling, that is, no resource will be really scheduled to any terminal, but only the resource allocation result of simulated resource scheduling will be recorded. Here a PRB is allocated to each terminal under some resource scheduling criterion in simulated resource scheduling as in the prior art, so a repeated description thereof will be omitted here.

Further to any one of the embodiments above, the method further includes:

After updated frequency spectrum reference units notified by the frequency spectrum allocation apparatus are received, the updated frequency spectrum reference units are notified to the respective served base stations, so that the base stations report second system throughputs determined on each updated frequency spectrum reference unit.

Particularly after updated frequency spectrum reference units notified by the frequency spectrum allocation apparatus are received, the updated frequency spectrum reference units are notified to the respective served base stations, and thereafter the operation 31 to the operation 33 are further repeated.

The frequency spectrum allocation method according to the embodiments of the invention will be described below in details with connection with two particular embodiments thereof.

Figure 4A:
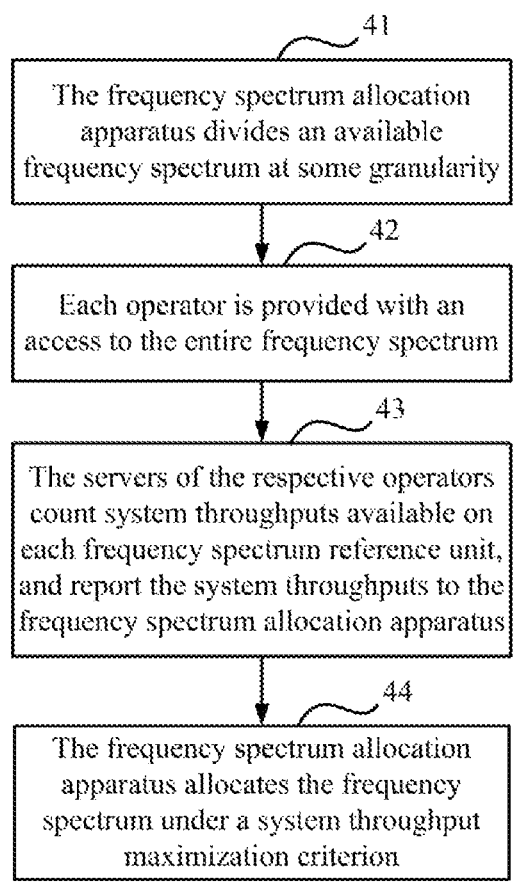
FIG. 4A is a schematic flow chart of a first embodiment of the invention.

In a first embodiment, the frequency spectrum allocation method according to the invention will be described from the perspective of interaction between the respective apparatuses. As illustrated in FIG. 4A the method includes the following operations:

Operation 41, the frequency spectrum allocation apparatus divides an available frequency spectrum served by the frequency spectrum allocation apparatus into at least two frequency spectrum reference units;

Operation 42, each operator can be provided with an access to all the frequency spectrum reference units;

Operation 43, the servers of the respective operators count system throughputs available on each frequency spectrum reference unit according to system throughputs reported by the base stations, and report the system throughputs to the frequency spectrum allocation apparatus; and Operation 44, the frequency spectrum allocation apparatus allocates the frequency spectrum under a system throughput maximization principle.

Figure 4B:
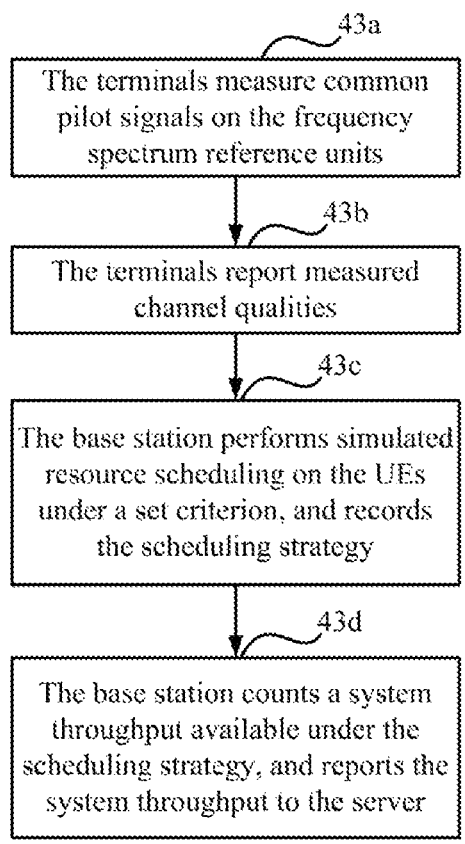
FIG. 4B is a schematic flow chart of reporting the system throughput by each of the base stations in operation 43.

Here in the operation 43, each of the base stations reports the system throughput particularly as illustrated in FIG. 4B, which includes:

Operation 43a, the terminals measure common pilot signals on all the PRBs of all the frequency spectrum reference units;

Operation 43b, the terminals report measured channel qualities to the base station serving the terminals;

Operation 43c, the base station performs simulated resource scheduling on the respective terminals under a set criterion, and records a resource allocation result; and Operation 43d, the base station counts a system throughput available on the respective PRBs of each frequency spectrum reference unit according to the resource allocation result, and reports the system throughput to the server.

In a second embodiment, for example, there are currently two operators in total sharing a segment of available frequency spectrum, which are denoted respectively as operator_A and operator_B sharing a frequency band of 10 MHz in total divided into frequency spectrum reference units, each of which is 5 MHz; and for example, there are two base stations deployed under each operator, which are denoted respectively as NodeB_a_1 and NodeB_a_2; and NodeB_b_1 and NodeB_b_2, where NodeB_a_1 represents a first base station of the operator a, and the same definition will apply to the other denominations, so a repeated description thereof will be omitted here. There are 30 UEs of each base station. Then a particular implementation flow of the inventive solution is as follows:

1. The frequency spectrum allocation apparatus divides an available frequency spectrum served by the frequency spectrum allocation apparatus at some granularity, so the 10-MHz frequency spectrum can be divided into two 5-MHz frequency spectrum reference units.

2. If both operator_A and operator_B can be provided with an access to the entire frequency spectrum, then operator_A and operator_B will count system throughputs thereof available on each frequency spectrum reference unit respectively, and report the system throughputs respectively to the frequency spectrum allocation apparatus.

Taking the operator A as an example:

All the terminals of NodeB_a_1 and NodeB_a_2 served by the operator measure channel qualities on all the frequency bands configured for the cells, and report the measured channel qualities respectively to the corresponding base stations;

In this operation, bandwidths allocated for the base stations, and their particular frequency ranges are determined as in the prior art, that is, by the operators, and the bandwidth is allocated in each cell particularly as in the prior art. For example, in this solution, NodeB_a_1 and NodeB_a_2 are deployed in the same-frequency network deployment scheme, and both of the base stations are allocated with 10-MHz frequency spectrum.

In this operation, the base station shall configure common pilot signals on all the frequency spectrums to be measured by the terminals; and the base stations perform simulated scheduling on the UEs according to reported measurement results under some criterion, and record their scheduling decisions, particularly as depicted in Table 3:

TABLE 3

A simulated scheduling result record table of the base station NodeB_a_1

| | Resource number | UE number | Throughput information |
|---|---|---|---|
| Frequency spectrum reference unit1 (5 MHz) | PRB_1 | UE_1 | Throughput_1 |
| | PRB_2 | UE_1 | Throughput_1 |
| | PRB_3 | UE_2 | Throughput_2 |
| | ... | ... | ... |
| | PRB_25 | UE_18 | Throughput_18 |
| Frequency spectrum reference unit 2 (5 MHz) | PRB_1 | UE_3 | Throughput_3 |
| | PRB_2 | UE_5 | Throughput_5 |
| | PRB_3 | UE_7 | Throughput_7 |
| | ... | ... | ... |
| | PRB_25 | UE_29 | Throughput_29 |

TABLE 4

A simulated scheduling result record table of the base station NodeB_a_2

| | Resource number | UE number | Throughput information |
|---|---|---|---|
| Frequency spectrum reference unit1 (5 MHz) | PRB_1 | UE_2 | Throughput_2 |
| | PRB_2 | UE_2 | Throughput_2 |
| | PRB_3 | UE_3 | Throughput_3 |
| | ... | ... | ... |
| | PRB_25 | UE_16 | Throughput_16 |
| Frequency spectrum reference unit 2 (5 MHz) | PRB_1 | UE_2 | Throughput_2 |
| | PRB_2 | UE_7 | Throughput_7 |
| | PRB_3 | UE_7 | Throughput_7 |
| | ... | ... | ... |
| | PRB_25 | UE_30 | Throughput_30 |

The two base stations count throughputs which may be available on all the frequency bands under a recorded scheduling strategy, and report the throughputs to the server of the operator, and the server integrates all the throughput data reported by the base stations served by the server as depicted in Table 5 and Table 6, where the throughputs of the first 25 PRBs corresponding to the throughput information in Table 3 and Table 4 are integrated as the throughput information corresponding to the frequency spectrum reference unit 1, and alike the throughputs of the last 25 PRBs corresponding to the throughput information in Table 3 and Table 4 are integrated as the throughput information corresponding to the frequency spectrum reference unit 2.

TABLE 5

Throughput information reported by Operator_A

| Operator number | Frequency spectrum reference unit 1 | Frequency spectrum reference unit 2 |
|---|---|---|
| Operator_A | Throught_A_1 | Throught_A_2 |

TABLE 6

Throughput information reported by Operator_B

| Operator number | Frequency spectrum reference unit 1 | Frequency spectrum reference unit 2 |
|---|---|---|
| Operator_B | Throught_B_1 | Throught_B_2 |

3. The frequency spectrum allocation apparatus schedules and allocates the frequency spectrums under the throughput maximum criterion, particularly as follows:

For each frequency spectrum reference unit, the throughputs of the respective operators on the frequency spectrum reference unit are sorted, and the operator with the highest throughput is provided with an access to the frequency spectrum reference unit. If Throught_A_1>Throught_B_1, then 5 MHz represented by the frequency spectrum reference unit 1 will be allocated to the operator A; and if Throught_A_2<Throught_B_2, then 5 MHz represented by the frequency spectrum reference unit 2 will be allocated to the operator B.

Figure 5:
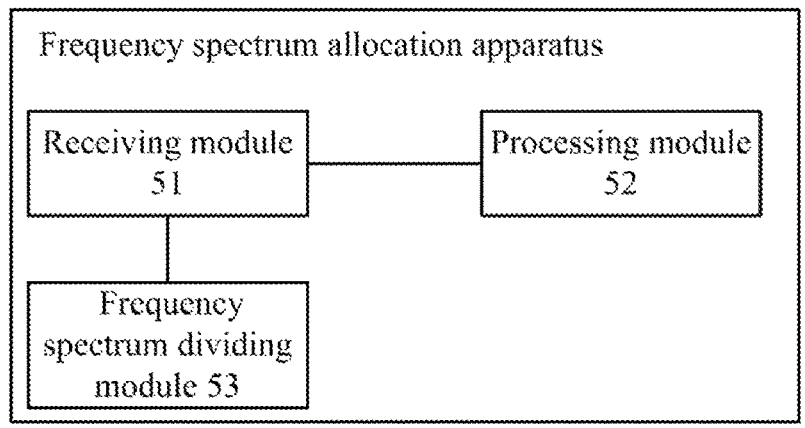
FIG. 5 is a schematic diagram of a frequency spectrum allocation apparatus according to an embodiment of the invention.

Based upon the same inventive idea, an embodiment of the invention further provides a frequency spectrum allocation apparatus as illustrated in FIG. 5 including:

A receiving module 51 is configured to receive first system throughputs, reported by servers of different operators and determined by the servers on each frequency spectrum reference unit, where an available frequency spectrum is divided into a number of frequency spectrum reference units; and A processing module 52 is configured, for each frequency spectrum reference unit, to allocate the frequency spectrum reference unit to an operator with the largest value of the first system throughput according to the first system throughputs reported by the servers of the respective operators on the frequency spectrum reference unit.

In an implementation, the apparatus further includes:

A frequency spectrum dividing module 53 is configured to re-divide the frequency spectrum reference units, and to notify the updated frequency spectrum reference units to the servers of the different operators, so that the servers of the respective operators report first system throughputs determined on each updated frequency spectrum reference unit.

Preferably the frequency spectrum dividing module 53 is particularly configured:

If the available frequency spectrum is changed, to re-divide the available frequency spectrum into frequency spectrum reference units at an original granularity for dividing an available frequency spectrum into frequency spectrum reference units; or If the granularity for dividing an available frequency spectrum into frequency spectrum reference units is changed, to re-divide the available frequency spectrum into frequency spectrum reference units at the updated granularity; or If both the available frequency spectrum and the granularity for dividing an available frequency spectrum into frequency spectrum reference units are changed, to re-divide the available frequency spectrum into frequency spectrum reference units at the updated granularity.

Figure 6:
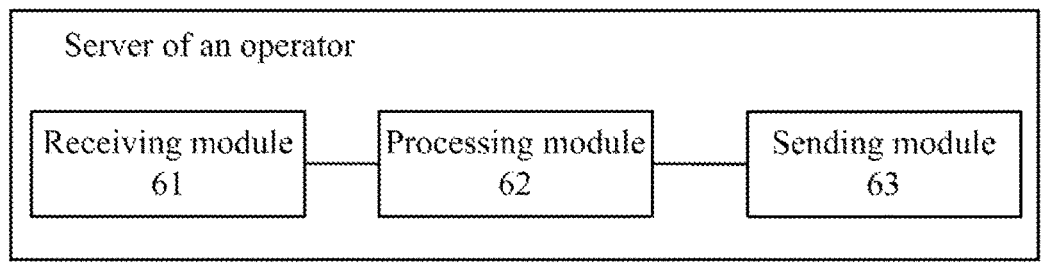
FIG. 6 is a schematic diagram of a server of an operator according to an embodiment of the invention.

Based upon the same inventive idea, an embodiment of the invention further provides a server of an operator, and as illustrated in FIG. 6, the server includes:

A receiving module 61 is configured to receive second system throughputs, reported by respective base stations served by the server, determined by the base stations on each frequency spectrum reference unit, where an available frequency spectrum is divided into a number of frequency spectrum reference units;

A processing module 62 is configured, for each frequency spectrum reference unit, to integrate the second system throughputs, reported by the respective base stations and determined on the frequency spectrum reference unit, and to determine a result of integration as a first system throughput corresponding to the frequency spectrum reference unit; and A sending module 63 is configured to report the determined first system throughput corresponding to each frequency spectrum reference unit to a frequency spectrum allocation apparatus.

Furthermore the receiving module 61 is further configured to receive updated frequency spectrum reference units notified by the frequency spectrum allocation apparatus; and The sending module 63 is further configured to notify the updated frequency spectrum reference units to the respective base stations served by the server, so that the base stations report second system throughputs determined on each updated frequency spectrum reference unit.

Figure 7:
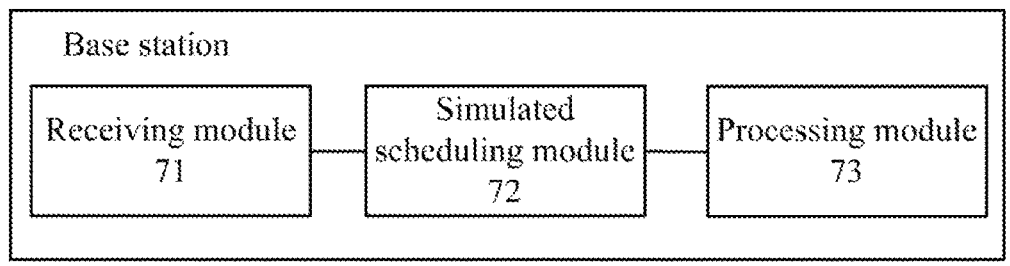
FIG. 7 is a schematic diagram of a base station according to an embodiment of the invention.

Based upon the same inventive idea, an embodiment of the invention further provides a base station as illustrated in FIG. 7 including:

A receiving module 71 is configured to receive channel qualities measured by respective terminals on each Physical Resource Block (PRB) of each frequency spectrum reference unit, where the base station configures a common pilot signal on each PRB of each frequency spectrum reference unit, and the channel quality measured on each PRB of each frequency spectrum reference unit is a channel quality measured by each terminal using the common pilot signal on the PRB;

A simulated scheduling module 72 is configured to perform simulated resource scheduling on each terminal, and to determine a corresponding channel quality on a PRB allocated simulatively to each terminal from the received channel qualities according to a resource allocation result of simulated resource scheduling; and A processing module 73 is configured to determine a corresponding system throughput on the PRB allocated simulatively to each terminal according to a corresponding relationship between a channel quality and a system throughput, to determine the determined system throughputs corresponding to the PRBs belonging to the respective frequency spectrum reference units as the second system throughputs of the respective frequency spectrum reference units, and to report the determined second system throughputs to a server of an operator.

Figure 8:
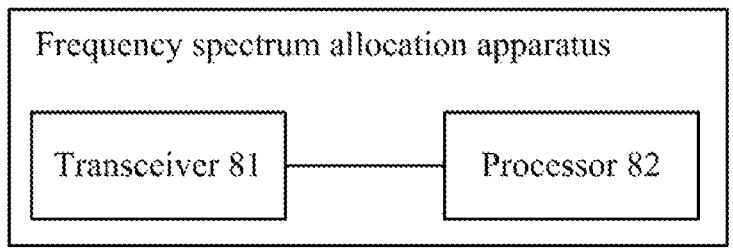
FIG. 8 is a schematic diagram of another frequency spectrum allocation apparatus according to an embodiment of the invention.

Based upon the same inventive idea, an embodiment of the invention further provides another frequency spectrum allocation apparatus as illustrated in FIG. 8 including a transceiver 81, and at least one processor 82 connected with the transceiver 81, where:

The transceiver 81 is configured to receive first system throughputs, reported by servers of different operators and determined by the servers on each frequency spectrum reference unit, where an available frequency spectrum is divided into a number of frequency spectrum reference units; and The processor 82 is configured, for each frequency spectrum reference unit, to allocate the frequency spectrum reference unit to an operator with the largest value of the first system throughput according to the first system throughputs reported by the servers of the respective operators on the frequency spectrum reference unit.

Where the transceiver 81 and the processor 82 can be connected via a bus.

In an implementation, the processor 82 is further configured:

To re-divide the frequency spectrum reference units, and to notify the updated frequency spectrum reference units to the servers of the different operators, so that the servers of the respective operators report first system throughputs determined on each updated frequency spectrum reference unit.

Preferably the processor 82 is particularly configured:

If the available frequency spectrum is changed, to re-divide the available frequency spectrum into frequency spectrum reference units at an original granularity for dividing an available frequency spectrum into frequency spectrum reference units; or If the granularity for dividing an available frequency spectrum into frequency spectrum reference units is changed, to re-divide the available frequency spectrum into frequency spectrum reference units at the updated granularity; or If both the available frequency spectrum and the granularity for dividing an available frequency spectrum into frequency spectrum reference units are changed, to re-divide the available frequency spectrum into frequency spectrum reference units at the updated granularity.

Figure 9:
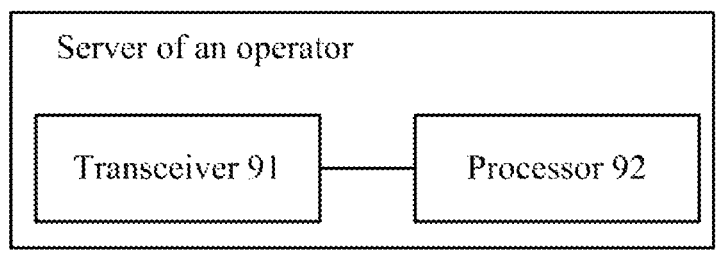
FIG. 9 is a schematic diagram of another server of an operator according to an embodiment of the invention.

Based upon the same inventive idea, an embodiment of the invention further provides another server of an operator, and as illustrated in FIG. 9, the server includes a transceiver 91, and at least one processor 92 connected with the transceiver 91, where:

The transceiver 91 is configured to receive second system throughputs, reported by respective base stations served by the server and determined by the base stations on each frequency spectrum reference unit, where an available frequency spectrum is divided into a number of frequency spectrum reference units;

The processor 92 is configured, for each frequency spectrum reference unit, to integrate the second system throughputs, reported by the respective base stations and determined on the frequency spectrum reference unit, and to determine a result of integration as a first system throughput corresponding to the frequency spectrum reference unit; and The transceiver 91 is configured to report the determined first system throughput corresponding to each frequency spectrum reference unit to a frequency spectrum allocation apparatus.

Where the transceiver 91 and the processor 92 can be connected via a bus.

Furthermore the transceiver 91 is further configured to receive updated frequency spectrum reference units notified by the frequency spectrum allocation apparatus; and to notify the updated frequency spectrum reference units to the respective base stations served by the server, so that the base stations report second system throughputs determined on each updated frequency spectrum reference unit.

Figure 10:
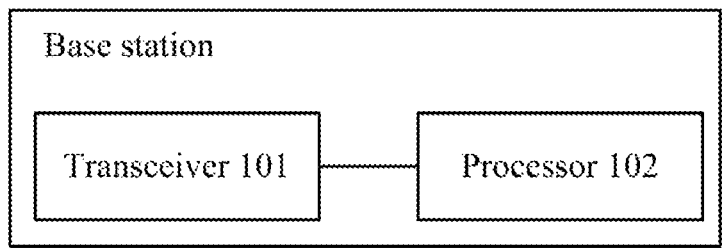
FIG. 10 is a schematic diagram of another base station according to an embodiment of the invention.

Based upon the same inventive idea, an embodiment of the invention further provides another base station as illustrated in FIG. 10 including a transceiver 101, and at least one processor 102 connected with the transceiver 101, where:

The transceiver 101 is configured to receive channel qualities measured by respective terminals on each Physical Resource Block (PRB) of each frequency spectrum reference unit, where the base station configures a common pilot signal on each PRB of each frequency spectrum reference unit, and the channel quality measured on each PRB of each frequency spectrum reference unit is a channel quality measured by each terminal using the common pilot signal on the PRB;

The processor 102 is configured to perform simulated resource scheduling on each terminal, and to determine a corresponding channel quality on a PRB allocated simulatively to each terminal from the received channel qualities according to a resource allocation result of simulated resource scheduling; to determine a corresponding system throughput on the PRB allocated simulatively to each terminal according to a corresponding relationship between a channel quality and a system throughput, to determine the determined system throughputs corresponding to the PRBs belonging to the respective frequency spectrum reference units as the second system throughputs of the respective frequency spectrum reference units; and The transceiver 101 is configured to report the determined second system throughputs of the respective frequency spectrum reference units to a server.

Where the transceiver 101 and the processor 102 can be connected via a bus.

Figure 11:
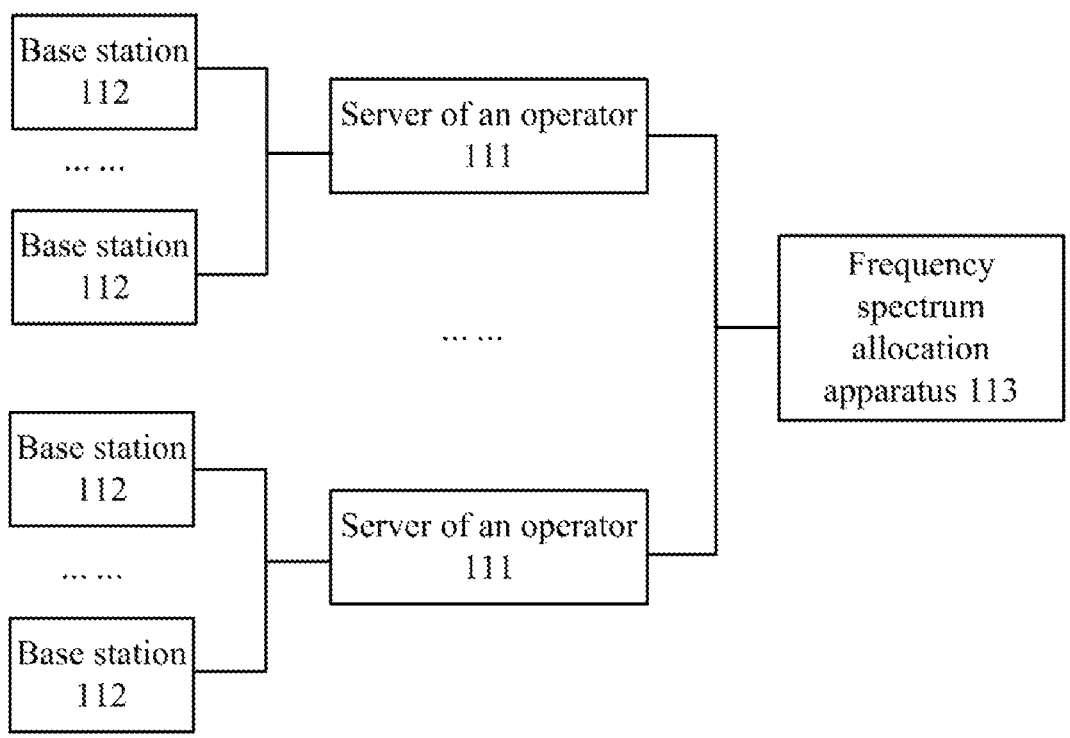
FIG. 11 is a schematic diagram of a communication system according to an embodiment of the invention.

Based upon the same inventive idea, an embodiment of the invention further provides a communication system as illustrated in FIG. 11 including:

Servers 111 of operators are configured to receive second system throughputs, reported by respective base stations 112 served by the servers and determined by the base stations on each frequency spectrum reference unit; for each frequency spectrum reference unit, to integrate the second system throughputs, reported by the respective base stations 112 and determined on the frequency spectrum reference unit, and to determine results of integration as first system throughputs corresponding to the frequency spectrum reference unit; and to report the determined first system throughputs corresponding to each frequency spectrum reference unit to a frequency spectrum allocation apparatus; and The frequency spectrum allocation apparatus 113 is configured to receive the first system throughputs, reported by the servers of the different operators and determined by the servers on each frequency spectrum reference unit, where an available frequency spectrum is divided into a number of frequency spectrum reference units; and for each frequency spectrum reference unit, to allocate the frequency spectrum reference unit to an operator with the largest value of the first system throughput according to the first system throughputs reported by the servers of the respective operators on the frequency spectrum reference unit.

Preferably each of the base stations 112 is particularly configured:

To receive channel qualities measured by respective terminals on each Physical Resource Block (PRB) of each frequency spectrum reference unit, where the base station configures a common pilot signal on each PRB of each frequency spectrum reference unit, and the channel quality measured on each PRB of each frequency spectrum reference unit is a channel quality measured by each terminal using the common pilot signal on the PRB;

To perform simulated resource scheduling on each terminal, and to determine a corresponding channel quality on a PRB allocated simulatively to each terminal from the received channel qualities according to a resource allocation result of simulated resource scheduling; and To determine a corresponding system throughput on the PRB allocated simulatively to each terminal according to a corresponding relationship between a channel quality and a system throughput, and to determine the determined system throughputs corresponding to the PRBs belonging to the respective frequency spectrum reference units as the second system throughputs of the respective frequency spectrum reference units.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A frequency spectrum allocation method, the method comprising:
receiving first system throughputs, reported by servers of different operators and determined by the servers on each frequency spectrum reference unit, wherein an available frequency spectrum is divided into a number of frequency spectrum reference units; and
for each frequency spectrum reference unit, allocating the frequency spectrum reference unit to an operator with a largest value of the first system throughput according to the first system throughputs reported by the servers of the respective operators on the frequency spectrum reference unit.

2. The method according to claim 1, wherein the method further comprises:
re-dividing the frequency spectrum reference units, and notifying the updated frequency spectrum reference units to the servers of the different operators, so that the servers report first system throughputs determined on each updated frequency spectrum reference unit.

3. The method according to claim 2, wherein the re-dividing the frequency spectrum reference units comprises:
if the available frequency spectrum is changed, then re-dividing the available frequency spectrum into frequency spectrum reference units at an original granularity for dividing an available frequency spectrum into frequency spectrum reference units; or
if the granularity for dividing an available frequency spectrum into frequency spectrum reference units is changed, then re-dividing the available frequency spectrum into frequency spectrum reference units at the updated granularity; or
if both the available frequency spectrum and the granularity for dividing an available frequency spectrum into frequency spectrum reference units are changed, then re-dividing the available frequency spectrum into frequency spectrum reference units at the updated granularity.

4. A spectrum allocation method, the method comprising:
receiving second system throughputs, reported by respective served base stations, determined by the base stations on each frequency spectrum reference unit, wherein an available frequency spectrum is divided into a number of frequency spectrum reference units;
for each frequency spectrum reference unit, integrating the second system throughputs, reported by the respective base stations and determined on the frequency spectrum reference unit, and determining a result of integration as a first system throughput corresponding to the frequency spectrum reference unit; and
reporting the determined first system throughput corresponding to each frequency spectrum reference unit to a frequency spectrum allocation apparatus.

5. The method according to claim 4, wherein the determining, by each of the base stations, the second system throughput on each frequency spectrum reference unit comprises:

receiving, by the base station, channel qualities measured by respective terminals on each Physical Resource Block, PRB, of each frequency spectrum reference unit, wherein the base station configures a common pilot signal on each PRB of each frequency spectrum reference unit, and the channel quality measured on each PRB of each frequency spectrum reference unit is a channel quality measured by each terminal using the common pilot signal on the PRB;
performing, by the base station, simulated resource scheduling on each terminal, and determining a corresponding channel quality on a PRB allocated simulatively to each terminal from the received channel qualities according to a resource allocation result of simulated resource scheduling; and
determining, by the base station, a corresponding system throughput on the PRB allocated simulatively to each terminal according to a corresponding relationship between a channel quality and a system throughput, and determining the determined system throughputs corresponding to the PRBs belonging to the respective frequency spectrum reference units as the second system throughputs of the respective frequency spectrum reference units.

6. The method according to claim 5, wherein the method further comprises:
after updated frequency spectrum reference units notified by the frequency spectrum allocation apparatus are received, notifying the updated frequency spectrum reference units to the respective served base stations, so that the base stations report second system throughputs determined on each updated frequency spectrum reference unit.

7. The method according to claim 4, wherein the method further comprises:
after updated frequency spectrum reference units notified by the frequency spectrum allocation apparatus are received, notifying the updated frequency spectrum reference units to the respective served base stations, so that the base stations report second system throughputs determined on each updated frequency spectrum reference unit.

8. A frequency spectrum allocation apparatus, comprising:
a transceiver configured to receive first system throughputs, reported by servers of different operators, determined by the servers on each frequency spectrum reference unit, wherein an available frequency spectrum is divided into a number of frequency spectrum reference units; and
at least one processor coupled with the transceiver, the at least one processor configured, for each frequency spectrum reference unit, to allocate the frequency spectrum reference unit to an operator with a largest value of the first system throughput according to the first system throughputs reported by the servers of the respective operators on the frequency spectrum reference unit.

9. The apparatus according to claim 8, wherein the at least one processor s further configured to:
re-divide the frequency spectrum reference units, and to notify the updated frequency spectrum reference units to the servers of the different operators, so that the servers report first system throughputs determined on each updated frequency spectrum reference unit.

10. The apparatus according to claim 9, wherein the at least one processor is configured to:

if the available frequency spectrum is changed, re-divide the available frequency spectrum into frequency spectrum reference units at an original granularity for dividing an available frequency spectrum into frequency spectrum reference units; or if the granularity for dividing an available frequency spectrum into frequency spectrum reference units is changed, re-divide the available frequency spectrum into frequency spectrum reference units at the updated granularity; or if both the available frequency spectrum and the granularity for dividing an available frequency spectrum into frequency spectrum reference units are changed, re-divide the available frequency spectrum into frequency spectrum reference units at the updated granularity.

11. A server of an operator, the server comprising:

a transceiver configured to receive second system throughputs, reported by respective base stations served by the server and determined by the base stations on each frequency spectrum reference unit, wherein an available frequency spectrum is divided into a number of frequency spectrum reference units;

at least one processor coupled with the transceiver, the at least one processor configured, for each frequency spectrum reference unit, to integrate the second system throughputs, reported by the respective base stations and determined on the frequency spectrum reference unit, and to determine a result of integration as a first system throughput corresponding to the frequency spectrum reference unit; and the transceiver is further configured to report the determined first system throughput corresponding to each frequency spectrum reference unit to a frequency spectrum allocation apparatus.

12. The server according to claim 11, wherein the transceiver is further configured to:

receive updated frequency spectrum reference units notified by the frequency spectrum allocation apparatus; and notify the updated frequency spectrum reference units to the respective base stations served by the server, so that the base stations report second system throughputs determined on each updated frequency spectrum reference unit.

* * * * *